US009325685B2

(12) United States Patent
Yamamoto et al.

(10) Patent No.: US 9,325,685 B2
(45) Date of Patent: Apr. 26, 2016

(54) AUTHENTICATION SWITCH AND NETWORK SYSTEM

(71) Applicant: ALAXALA Networks Corporation, Kanagawa (JP)

(72) Inventors: Yasunori Yamamoto, Kawasaki (JP); Hidemitsu Higuchi, Kawasaki (JP); Motohide Nomi, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 206 days.

(21) Appl. No.: 14/045,560

(22) Filed: Oct. 3, 2013

(65) Prior Publication Data

US 2014/0223511 A1 Aug. 7, 2014

(30) Foreign Application Priority Data

Feb. 4, 2013 (JP) ................................. 2013-019071

(51) Int. Cl.
*H04L 29/06* (2006.01)
*H04L 29/08* (2006.01)

(52) U.S. Cl.
CPC ............ *H04L 63/08* (2013.01); *H04L 67/2814* (2013.01); *H04L 63/168* (2013.01)

(58) Field of Classification Search
CPC ..... H04L 63/08; H04L 47/122; H04L 63/168; H04L 67/2814
See application file for complete search history.

(56) References Cited

U.S. PATENT DOCUMENTS

| 6,578,066 | B1 * | 6/2003 | Logan et al. ................... 718/105 |
| 7,234,158 | B1 * | 6/2007 | Guo .................... H04L 63/0815 709/229 |
| 2006/0021004 | A1 * | 1/2006 | Moran et al. ....................... 726/2 |
| 2007/0214265 | A1 * | 9/2007 | Zampiello ........... H04L 67/1017 709/226 |
| 2008/0319857 | A1 * | 12/2008 | Dobbins ............ G06Q 30/0277 705/14.73 |
| 2011/0119735 | A1 | 5/2011 | Higuchi et al. |

FOREIGN PATENT DOCUMENTS

JP 2011-107796 A 6/2011
JP 2011-238162 A 11/2011

OTHER PUBLICATIONS

No stated author; Cisco—Configuring Web-Based Authentication; 2010 ; Retrieved from the Internet <URL: .cisco.com/c/en/us/td/docs/switches/lan/catalyst3750x_3560x/software/release/12-2_53_se/configuration/guide/3750xscg.pdf>; pp. 1-20 as printed.*
No stated author; Meraki—Meraki for Service Providers: Captive Portal Configuration; Jul. 2012; Retrieved from the Internet <URL: ironcovesolutions.com/pdf/cisco/meraki/Meraki-Captive-Portal-Configuration.pdf>; pp. 1-13 as printed.*
Rahulmkhj et al.; Sense Portal—Captive Portal on External Server??; 2012; Retrieved from the Internet <URL: forum.pfsense.org/index.php?topic=46015.0>; pp. 1-6 as printed.*

* cited by examiner

*Primary Examiner* — Saleh Najjar
*Assistant Examiner* — Oleg Korsak
(74) *Attorney, Agent, or Firm* — Mattingly & Malur, P.C.

(57) ABSTRACT

An authentication switch monitors a failure of an external server, and redirect information to a Web server that holds authentication information registration screen data is provided to a terminal using a monitoring result. A life-and-death monitoring control unit for monitoring life and death of an external Web server is disposed within an authentication switch to monitor the life and death of the external Web server. An authentication processing unit within the authentication switch switches the redirect information on the basis of a life-and-death monitoring table of the external Web server provided in the life-and-death monitoring control unit in response to an authentication request from the terminal, and enables web authentication even when the external Web server is in failure.

8 Claims, 9 Drawing Sheets

FIG. 4

LIFE-AND-DEATH MONITORING TABLE (307)

| URL (600) | IP ADDRESS (601) | LIFE-AND-DEATH STATE (602) | MONITOR INTERVAL TIME (603) | NORMAL SPECIFIED NUMBER (604) | FAILURE SPECIFIED NUMBER (605) | NORMAL COUNTER (606) | FAILURE COUNTER (607) | PRIORITY (608) |
|---|---|---|---|---|---|---|---|---|
| URL_A | 192.168.10.10 | 0 | 60 | 1 | 1 | 0 | 0 | 2 |
| URL_B | 192.168.10.20 | 0 | 60 | 1 | 1 | 0 | 0 | 1 |
| URL_C | 192.168.10.30 | 0 | 60 | 1 | 1 | 0 | 0 | 3 |

SERVER SELECTION CONDITION TABLE — 315

| TERMINAL AND CONNECTION INFORMATION (EXAMPLE: IP ADDRESS OF TERMINAL) 700 | URL OF EXTERNAL WEB SERVER 701 |
|---|---|
| 192. 200. 100. 10 | URL_A |
| 192. 200. 200. 10 | URL_B |
| 192. 200. 200. 20 | URL_B |
| 192. 200. 300. 10 | URL_C |

AUTHENTICATION SWITCH AND NETWORK SYSTEM

CROSS-REFERENCE TO RELATED APPLICATIONS

This application relates to and claims priority from Japanese Patent Application No. 2013-019071, filed on Feb. 4, 2013, the entire disclosure of which is incorporated herein by reference.

BACKGROUND OF THE INVENTION

1. Field of the Invention

The present invention relates to an authentication switch, a network system having the authentication switch, and an authentication method associated with the authentication switch, and more particularly to a switch that conducts Web authentication.

2. Description of the Related Art

With the infrastructure of a communication network, a variety of functions for enhancing security has been proposed. A network authentication belongs to one of those functions. A network authentication system is mainly configured by a terminal device such as a PC, an authentication switch, and an authentication server. As a basic operation of the authentication system, an authentication request packet is first output to the authentication switch from the terminal device such as a PC.

JP-A-2011-107796 discloses a system that conducts the Web authentication with the aid of the authentication switch. Upon receiving the authentication request packet, the authentication switch inquires of the authentication server on the basis of authentication information in the received packet about whether the authentication information has been registered, or not. When the authentication switch receives from the authentication server a notification that the authentication information has been registered, the authentication switch makes a source MAC address of the authentication request packet communicatable.

In the Web authentication of the authentication switch, the authentication request packet is transmitted from the terminal to the authentication switch with the use of http, and authentication screen data (login screen data) is returned to the terminal by a Web server within the authentication server. A user who uses the terminal enters information on a user ID, a password, and the like from an authentication login screen (login screen data), and transmits the information to the authentication switch. The authentication switch inquires of the authentication server with the use of the received authentication information such as the user ID or the password, and allows a packet having a MAC address of an appropriate terminal to be transferred if the authentication information has been registered in the authentication server.

JP-A-2011-238162 discloses a system in which if a network device disposed between the authentication server and a client terminal determines that the authentication server stops its function, the network device makes an authentication in an authentication system different from that of the authentication server.

SUMMARY OF THE INVENTION

In the patent publications disclosed in the Background Art, if authentication cannot be continued by a state of an external server since an access from the terminal till an authentication completion, there is a need to finish the authentication, or again conduct authentication processing in another system. In this case, it takes time to access to a desired site from the terminal. A bandwidth may also be wasted.

For example, in the Web authentication, the authentication screen (login screen data) is downloaded from the authentication switch in response to an authentication request from the terminal. The authentication screen (login screen data) is normally set within the authentication switch, and used. The authentication screen is provided with an area for entering the user ID and password information. However, because the authentication screen is distributed to the user who uses the network, the authentication screen becomes a tool for providing information to the user depending on a use environment (enterprise, university).

Therefore, there is a need to insert image data and the like into the authentication screen (login screen data), or add new information thereto. However, in the authentication switch, there is a limit to the resource such as a memory, making it difficult to realize this configuration. For that reason, there is a need to provide the external Web server with the authentication screen data. In the authentication switch, the memory cannot be expanded according to the authentication screen data volume. However, if the memory and disc capacity can be expanded in the external Web server, the authentication screen (login screen data) is provided in the external Web server, thereby enabling additional information to be added to the authentication screen.

Also, in order to access the authentication screen of the external Web server from the terminal, there is a need to redirect an authentication request from the terminal to the authentication switch, to the external Web server (the authentication switch needs to give a redirect access instruction of the access from the terminal, to the external Web server).

Also, when the authentication screen data is provided to the external Web server to fix a redirect destination, because the terminal makes a request for the authentication screen to the external Web server even during the external Web server failure, the authentication screen cannot be downloaded. As a result, because the network authentication cannot be conducted to cause such a problem that a communication to the external network through the authentication switch cannot be conducted. Therefore, the server must be switched between the external Web server and the Web server within the authentication switch.

In order to solve at least one of the problems, according to one aspect of the present invention, for example, an authentication switch that encompasses the terminal is connected to an authentication server, a first server that holds a content associated with data to be transmitted to the authentication server, and a second server with which the terminal can communicate according to an authentication result of the authentication server through a network, monitors a state of the first server, and makes a redirect notification including a URL of the redirect destination to the terminal on the basis of the state of the first server in response to an access request to the second server from the terminal. Also, the authentication switch updates an access status of the terminal to the authentication switch on the basis of the authentication result of the authentication server based on the data associated with the content provided in response to the request from the terminal according to the redirect notification. Also, the authentication switch relays a communication from the terminal to the second server according to the access request.

The authenticating process is enabled according to a running status of the servers, and a communication status with the servers.

BRIEF DESCRIPTION OF THE DRAWINGS

FIG. 4 is a diagram illustrating a life-and-death monitoring table;

FIG. 8 is a diagram illustrating a server selection condition table; and

DESCRIPTION OF THE PREFERRED EMBODIMENTS

Figure 1:
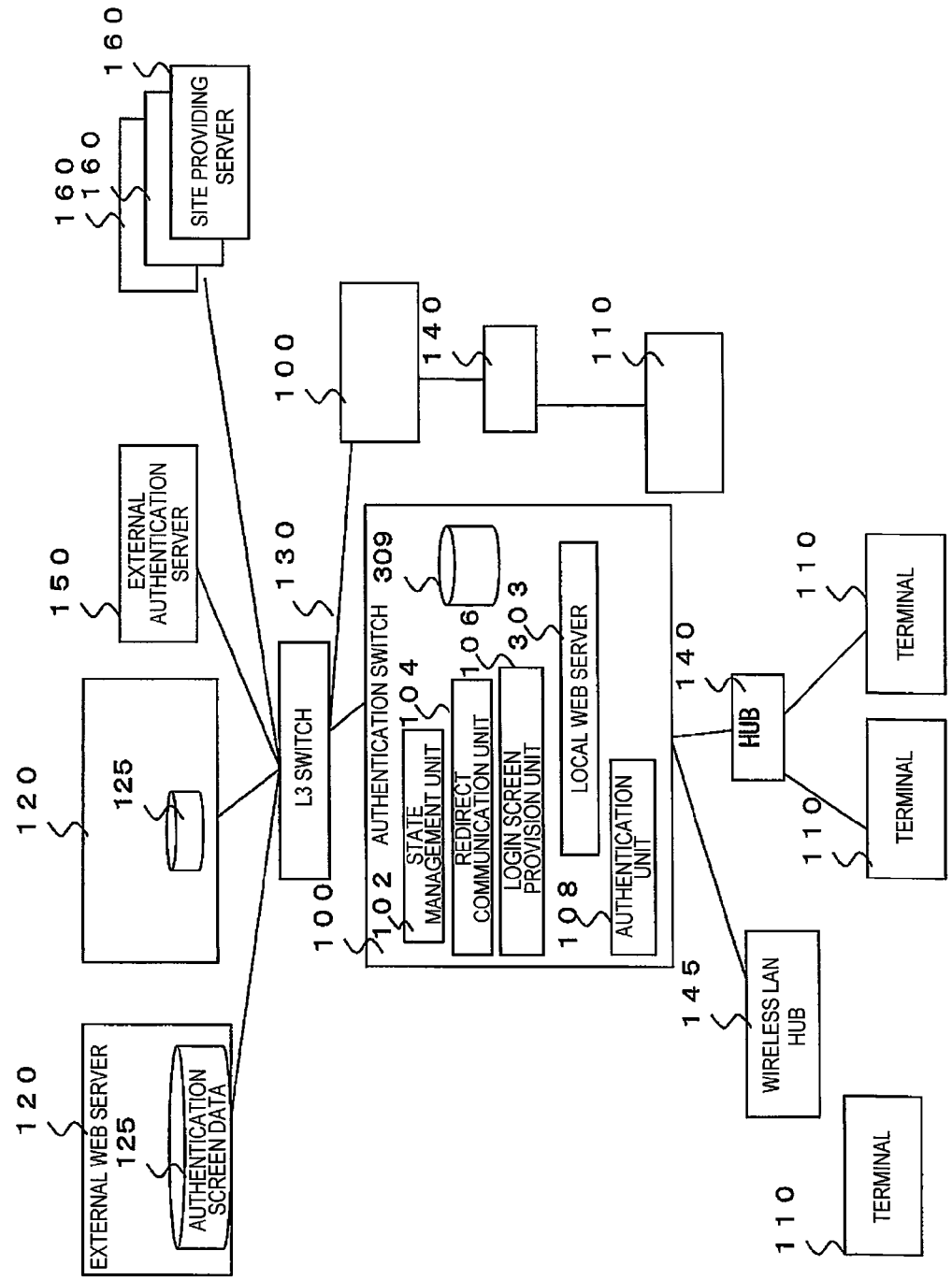
FIG. 1 is a diagram illustrating a configuration of a network system.

Hereinafter, embodiments of the present invention will be described with reference to FIGS. 1 to 9. Substantially the same parts are denoted by identical reference numerals or symbols, and their description will not be repeated.

FIG. 1 illustrates a network system including an authentication system. Referring to FIG. 1, the system includes authentication switches 100, terminals 110, external Web servers 120, an L3 switch 130, hubs 140, an external authentication server 150, and site providing servers 160.

The terminals 110 are connected to the authentication switches 100 through the hubs 140. The authentication switches 100 are connected to the external Web servers 120 and the external authentication server 150 through the L3 switch 130.

The terminals 110 are computer devices such as PCs (personal computers) that communicate with the site providing servers 160. Also, the terminals 110 each include, for example, information processing devices and a calculator. Also, a wireless LAN hub 145 or a switch is configured as a wireless base station. When the wireless LAN network is provided, the terminals 110 may be configured by a wireless terminal or an information processing device having a wireless communication function. The site providing servers 160 are servers for providing a variety of services to the terminals 110, for example, business servers within enterprises or schools.

The external authentication server 150 is a server for authenticating the terminals 110, and stores authentication information on the terminals 110 therein.

The external Web server is a calculator or an information processing device for holding authentication screen data 125 to be provided to the terminal. The authentication screen data 125 includes a display area for entering at least an identifier (IDs) of the terminals 110 and an identifier of a user using the terminal, and an input area of a password used in an authenticating process of the external authentication server. In a case of the external Web server, a larger number of resources are provided than that in the authentication switch, and a disc capacity can be easily expanded. Therefore, in the authentication screen (login screen data) held by the external Web server, the authentication screen data 125 may include information having additional information added to the authentication screen other than the input/display area of the ID and the password in the authentication screen data 125, as compared with the authentication screen held by the authentication switch.

As the external Web servers 120, a plurality of servers may be provided, or a predetermined single server may be provided. With the provision of the plurality of external Web servers 120, a system redundant function can be more enhanced. Each of the authentication switches 100 is a switch device that relays a communication between the terminals 110 and the site providing servers 160. Also, each of the authentication switches 100 is a gateway that authenticates the terminals 110 of communication sources which requests an access to the site providing servers 160.

The authentication switch includes a state management unit 102, a redirect communication unit 104, a login screen provision unit 106, an authentication unit 108, a local Web server 303, and authentication screen data 309.

The local Web server 303 conducts processing of a proxy server that provides an authentication screen (login data) instead of the external Web server 120 if the external Web servers 120 are in failure.

The authentication switches 100 each allow the login screen held by the external Web server or the authentication switches 100 per se to be displayed in response to an access to a site provision server from an unauthenticated terminal, and forcedly requests the authenticating process. In particular, in this embodiment, the authentication switches 100 monitor a failure and restoration of the external Web server, and set a redirect destination to the local Web server 303 of the authentication switch if the failure is detected, and to the external Web servers 120 if the restoration is detected.

The state management unit 102 of the authentication switches 100 monitors a running status or a failure occurrence status of the external Web server which is a provision source of the login screen.

On the other hand, the authentication switches 100 request the authenticating process in response to the access request to the site provision server from the unauthenticated terminal. In this embodiment, the authenticating process request is a request for redirecting the authentication request from the terminal to the authentication switch to the external Web server in order to allow the authentication screen of the external Web server to be accessed from the terminal. That is, the redirect communication unit 104 of the authentication switch gives a redirect access instruction to the external Web server selected on the basis of the monitor result of the state management unit 102, or to the local Web server within the authentication switch in response to the access from the terminal. This request includes a notification of the redirect destination, that is, URL for designating the resource providing the authentication screen data which is information necessary for conducting the authenticating process. The redirection destination is determined to the external Web server or the authentication switches 100 per se on the basis of the monitoring results of the running status or the failure occurrence status of the external Web server.

Then, upon receiving the login screen request from each of the terminals 110 according to the redirect notification, the login screen provision unit 106 of each authentication switch 100 provides the login screen data to the terminal 110 with the use of the authentication screen data of the external Web server, or the authentication screen data held by the authentication switch. The login screen data includes the display area for entering at least the identifier (IDs) of the terminal 110 and the identifier of the user using the terminal, and the input area of the password used in the authenticating process of the external authentication server. Further, upon receiving an authentication request including the ID and the password of the terminal 110 input in response to the login screen data from the terminal 110, the authentication unit 108 of the authentication switch 100 transmits the authentication request to the external authentication server. Upon receiving the authorization result from the external authentication server, the authentication switch 100 transmits the authentication result to the terminal 110.

With the above processing, the authentication switch selects the redirect destination according to the status of the server providing the authentication screen in response to the access from the unauthenticated terminal, and conducts the authenticating process. Upon completion of the authentication, the terminal 110 enables a communication with the site providing servers 160. The outline of the authentication switch and the configuration of the system are described above.

Figure 2:
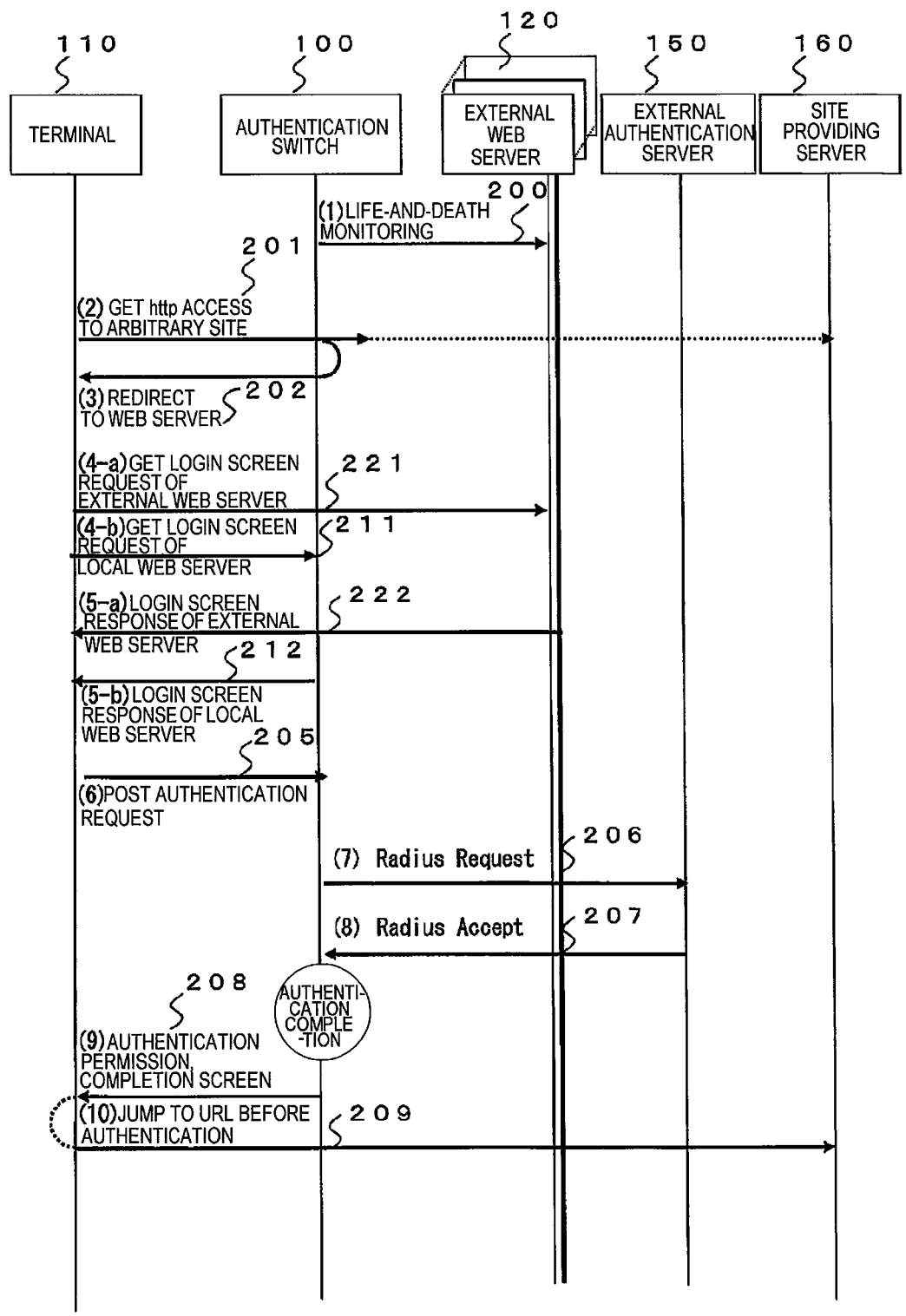
FIG. 2 is a diagram illustrating a sequence among a terminal, an authentication switch, a plurality of external Web servers, an external authentication server, and a site providing server.

Referring to FIG. 2, a description will be given of the authenticating process using the authentication switch described in FIG. 1 with reference to a sequence diagram. In the first embodiment, FIG. 2 illustrates a sequence among the terminal 110, the authentication switch 100, the external Web server 120, a plurality of external authentication servers 150, and the site providing server 160.

The authentication switch 100 (for example, state management unit 102) periodically monitors a life-and-death state of the external Web servers 120 (200).

Figure 5:
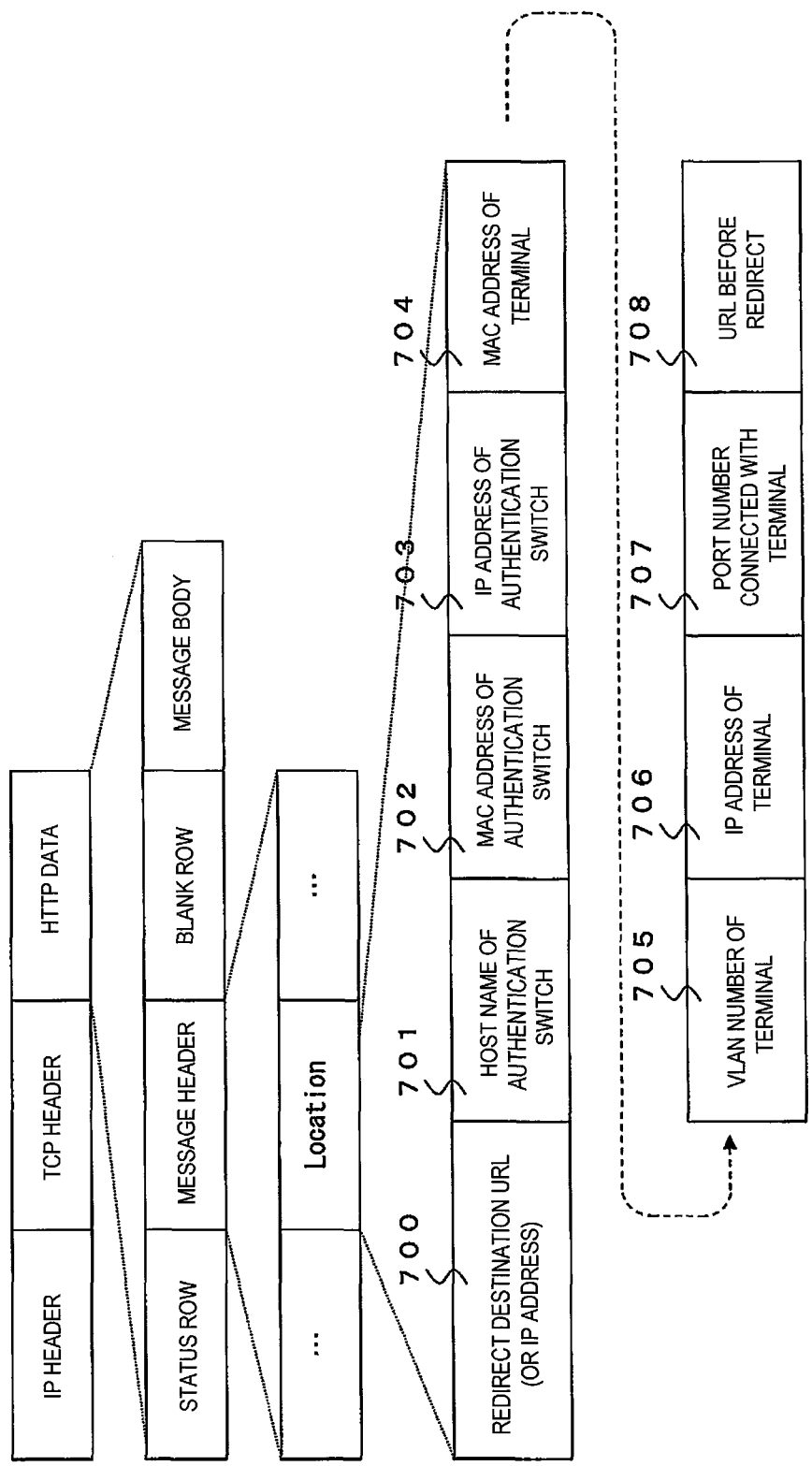
FIG. 5 is a diagram illustrating an HTTP response message format.

The authentication switch 100 (for example, redirect communication unit 104) notifies the terminal 110 of the access information on the Web server in response to the access request (GET method in which the type of the access is http (hypertext transfer protocol)) (201) from the terminal 110 to a given site of the network (202). If the external Web server 120 normally runs, the authentication switch 100 notifies the terminal 110 of the access information on the external Web server 120 as a URL redirect destination server. On the other hand, if the external Web server 120 is in failure, the authentication switch 100 notifies the terminal 110 of the access information on the local Web server within the authentication switch 100 as the URL redirect destination server (210). A specific configuration example of this notification message is illustrated in FIG. 5, but its details will be described later.

If the URL redirect destination server is designated as the external Web server 120, the terminal 110 requests the authentication screen (login screen data) from the external Web server 120 (one of the normally running servers) which is the URL redirect destination server (GET method in which the type of the access is http) (221). The external Web server 120 (one of the normally running external Web servers) responds to the terminal 110 with the authentication screen (login screen data) through the authentication switch 100 (for example, login screen provision unit 106) (222).

If the URL redirect destination server is designated as the local Web server within the authentication switch 100, the terminal 110 requests the authentication screen (login screen data) from the local Web server within the authentication switch 100 which is the URL redirect destination server (211). The local Web server within the authentication switch 100 transmits the authentication screen (login screen data) to the terminal 110 (for example, through the login screen provision unit 106) (212).

The terminal 110 requests the login authentication from the authentication switch 100 (POST method in which the type of the access is http) (205). The authentication switch 100 (for example, authentication unit 108) requests the login authentication from the external authentication servers 150 (206). In FIG. 2, it is assumed that the external authentication server 150 is a Radius server. The external authentication server 150 notifies the authentication switch 100 of the authentication result (207).

After the completion of authentication permission, the authentication switch 100 notifies the terminal 110 of a completion screen, and a URL (URL included in the http access of 201) before authentication (208), and jumps to URL before authentication (209), thereby enabling the terminal 110 to access to a given site. In order to jump in Sequence 209, upon receiving the access request to the given site from the terminal 110, the authentication switch 100 may hold the URL before authentication. Alternatively, the URL before authentication may be described in http data (within a form) transferred in the respective processing of Sequences 201 to 208 by a tag to take over the URL before authentication. If the authentication is not permitted, the authentication switch 100 notifies the terminal 110 of a screen of authentication non-permission.

If a plurality of the external Web servers 120 that normally runs is provided, an external Web server 120 whose normal running has first been confirmed may be selected. Also, any external Web server 120 can be selected according to the priority designated arbitrarily. The external Web server 120 may be selected according to terminal information on the terminal 110, connection information of the terminal 110, or the type of a given site of the network accessed from the terminal 110.

In Sequence 202, the redirect destination may be designated from at least one external Web server 120, and the local Web server 303 within the authentication switch. Also, the redirect destination may be designated from the plurality of the external Web servers 120. Further, the redirect destination may be designated to the running external Web server.

Figure 3:
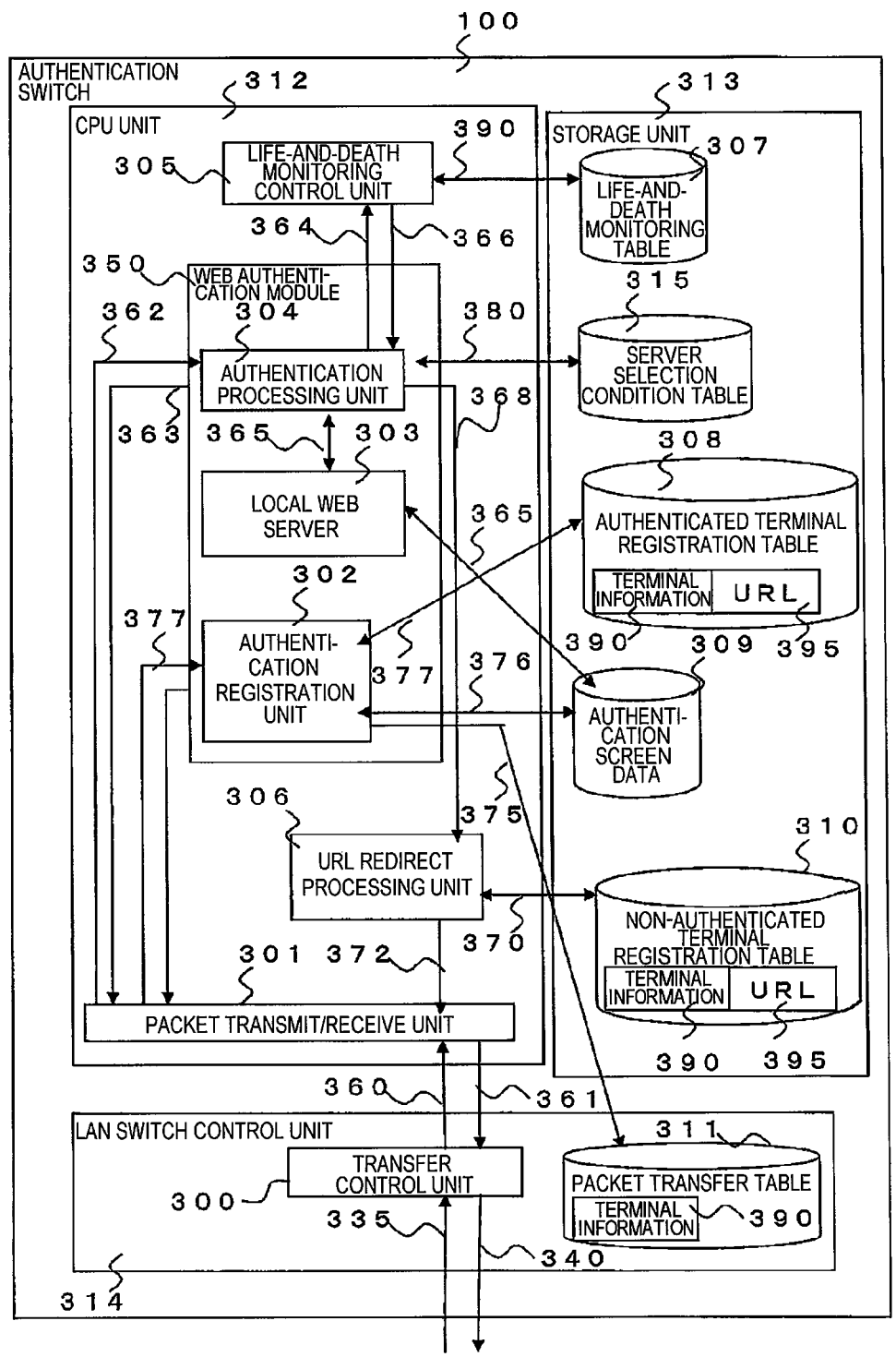
FIG. 3 is a diagram illustrating a device configuration of an authentication switch.

A device configuration of the authentication switch 100 will be described with reference to FIG. 3. Referring to FIG. 3, the authentication switch 100 includes a CPU unit 312, a storage unit 313, and a LAN switch control unit 314. The CPU unit 312 includes a packet transmit/receive unit 301, a Web authentication module 350 (including an authentication registration unit 302, an authentication processing unit 304, and a local Web server 303), a life-and-death monitoring control unit 305, and a URL redirect processing unit 306.

The storage unit 313 holds a life-and-death monitoring table 307, an authenticated terminal registration table 308, an authentication screen data 309, and a non-authenticated terminal registration table 310 therein. Also, if a plurality of authentication servers is provided, the storage unit 313 may also hold a server selection condition table 315.

The authentication screen data 309 stores the login screen data to be provided to the terminal 110, and the authentication screen data such as an authentication permission completion screen therein.

The life-and-death monitoring table 307 holds a running state or a failure state of the server which is a monitor result of the external Web server. Specifically, the life-and-death monitoring table 307 records the life-and-death information on the external Web server 120.

The non-authenticated terminal registration table 310 stores a MAC address, a VALN address, an IP address of the terminal 110 before authentication, and the URL (URL included in an http access in Sequence 201 of FIG. 2) 395 before authentication.

The authenticated terminal registration table 308 stores the MAC address, the VALN address, the IP address of the authenticated terminal 110, and the URL 395 before authentication (URL included in the http access in Sequence 201 of FIG. 2) in a terminal information 390 and the before-authentication URL 395 included in the non-authenticated terminal registration table 310.

The server selection condition table 315 includes the terminal information or the connection information of the terminal 110, or the type of the given site of the network accessed from the terminal 110 in association with the external Web server 120 selected in this case.

The LAN switch control unit 314 includes a transfer control unit 300 and a packet transfer table 311.

The packet transfer table 311 registers the MAC address of the authenticated terminal 110. That is, the packet transfer table 311 holds the information for specifying the authenticated terminal 110 that has been authenticated by a past access. The packet transfer table 311 may be stored in a memory provided by the LAN switch control unit 314. The packet from the MAC address registered in this table is transferred to the site providing servers 160.

The transfer control unit 300 receives the packet from the external through a port (335). The transfer control unit 300 discriminates whether the transmission source of the packet received from the external through the port has been registered in the packet transfer table 311, or not. If registered as a result of discrimination, the transfer control unit 300 transmits the received packet to the external through the port toward the site providing servers 160 (340).

If not registered as the discrimination result, in order that the transfer control unit 300 conducts the process of authenticating the terminal 110, the authentication is again required as a result that the terminal 110 has not been accessed in the past, or the terminal 110 has been logged out with a given time elapsed after an access, or logged out in response to a logout request. The packet received from the terminal 110 and the external authentication servers 150 through the network is transferred to the packet transmit/receive unit 301 (360). Also, the transfer control unit 300 receives an access packet to the given site of the network from the terminal 110, and transfers the access packet to the packet transmit/receive unit 301 present in the CPU unit 312 (360).

The transfer control unit 300 transfers the packet received from the packet transmit/receive unit 301 to the terminal 110 and the external authentication servers 150 (361).

The packet transmit/receive unit 301 transfers the packet received from the transfer control unit 300 to the authentication registration unit 302 and the authentication processing unit 304 (362). Also, the packet transmit/receive unit 301 transfers the packets received from the authentication registration unit 302, the authentication processing unit 304, and the URL redirect processing unit 306 to the transfer control unit 300 (361).

Specifically, an HTTP response message from the URL redirect processing unit 306 is transferred to the terminal 110 through the transfer control unit 300.

The authentication processing unit 304 conducts a Web authenticating process of the unauthenticated terminal 110. Specifically, the authentication processing unit 304 executes the authenticating process in response to the access request (GET method in which the type of the access is http) to the given site of the network. Because the information for specifying the terminal of the access request source is not registered in the packet transfer table 311, the unauthenticated terminal is processed by the authentication processing unit 304 so as to be forcedly subjected to the authenticating process.

The authentication processing unit 304 inquires of the life-and-death monitoring control unit 305 about the life-and-death information of the external Web server 120 pertaining to the URL information included in the packet (364).

If a plurality of external Web servers is provided, before the authentication processing unit 304 inquires of the life-and-death monitoring control unit 305 about the life-and-death information on the external Web server 120 (364), the authentication processing unit 304 may select the external Web server 120 from the server selection condition table 315 on the basis of the terminal information on the terminal 110 included in the packet, the connection information on the terminal 110, or the type of the given site of the network accessed from the terminal 110 (380). Then, the authentication processing unit 304 may inquire of the life-and-death monitoring control unit 305 about the life-and-death information on the selected external Web server 120 (364).

Also, the authentication processing unit 304 may acquire the life-and-death information on the external Web server 120 stored in the life-and-death monitoring table 307, or the running information on the external Web server associated with the life-and-death information.

The authentication processing unit 304 receives an inquiry result from the life-and-death monitoring control unit 305 (366), determines an URL redirect destination server from the life-and-death information on the external Web server 120, and notifies the URL redirect processing unit 306 of the determined URL redirect destination server (368).

The URL redirect processing unit 306 is an example of the redirect communication unit 104. The URL redirect processing unit 306 generates an HTTP response message including the URL of the URL redirect destination server. Also, the URL redirect processing unit 306 registers information 390 (for example, IP address as information for identifying the terminal) on the terminal 110 in association with the before-authentication URL 395 before authentication included in the access request in the non-authenticated terminal registration table 310 (370). The URL redirect processing unit 306 stores the redirect destination URL into a location header within the HTTP response message, and notifies the packet transmit/receive unit 301 of the redirect destination URL (372). FIG. 5 illustrates a configuration example of the location header, and its details will be described later.

If the URL redirect destination server is designated as the external Web server 120, the terminal 110 requests the authentication screen (login screen data) from the external Web server 120 which is the URL redirect destination server. The authentication switch 100 transfers the request to the external Web server 120 toward the address of the server determined as the URL redirect destination server included in the request. As an example of the login screen provision unit 106 in FIG. 1, the authentication switch 100 transfers the authentication screen (login screen data), which is transmitted from the external Web server 120, to the terminal 110 (corresponding to Sequence 204 in FIG. 2).

Thereafter, the authentication processing unit 304 of the authentication switch 100 receives the request for login authentication to the authentication switch 100 from the terminal 110 through the LAN switch control unit 314 according to the POST method of http (corresponding to Sequence 205 in FIG. 2). The authentication processing unit 304 requests the login authentication from the external authentication servers 150 through the LAN switch control unit 314 (corresponding to Sequence 206 in FIG. 2). In this embodiment, it is assumed that the external authentication server 150 is the Radius server. The external authentication server 150 notifies the authentication switch 100 of the authentication result (corresponding to Sequence 207 in FIG. 2). After the completion of the authentication permission, the authentication switch 100 notifies the terminal 110 of the completion screen (208).

After the completion of the authentication permission, the authentication switch 100 jumps with the use of the URL included in the access request (GET method in which the type of the access is http) (Sequence 201 in FIG. 2) to a given site to transfer the content provided by the given site to the terminal 110. If the authentication is unpermitted, the authentication switch 100 notifies the terminal 110 of the screen of the authentication non-permission.

On the other hand, if it is assumed that the URL redirect destination server is the local Web server 303 within the authentication switch 100, the URL redirect processing unit 306 of the authentication switch 100 notifies the terminal 110 of the access information on the local Web server within the authentication switch 100, as the URL redirect destination server. Then, the LAN switch control unit 314 notifies the authentication processing unit 304 of a request for authentication screen (login screen data) of the local Web server 303 from the terminal 110 through the transfer control unit 300 and the packet transmit/receive unit 301 on the basis of the access information (362). The request for the authentication screen (login screen data) is the GET method in which the type of the access is http as indicated by Sequences 203 and 204 in FIG. 2 (203). The terminal 110 requests the authentication screen (login screen data) from the local Web server within the authentication switch 100 which is the URL redirect destination server (211). As an example of the login screen provision unit 106 illustrated in FIG. 1, the local Web server within the authentication switch 100 acquires the authentication screen data 309, and transmits the authentication screen (login screen data) to the terminal 110 through the LAN switch control unit 314.

If there is a request for the login authentication from the terminal 110, the terminal 110 requests the login authentication from the external authentication server 150 through the transfer control unit 300, the packet transmit/receive unit 301, and the authentication processing unit 304.

The authentication processing unit 304 is an example of the authentication unit 108. The authentication processing unit 304 acquires the authentication screen (login screen data) 309 of the local Web server 303 which is the URL redirect destination server from the storage unit 313 through the local Web server 303 (365). The authentication processing unit 304 notifies the terminal 110 of the acquired authentication screen data 309 through the packet transmit/receive unit 301 and the transfer control unit 300 (363).

If the external Web server 120 is in failure, the local Web server 303 conducts the processing of the proxy server providing the authentication screen (login data) instead of the external Web server 120. The local Web server 303 extracts the authentication screen (login screen data) from the authentication screen data 309, and supplies the authentication screen (login screen data) to the terminal 110. When the local Web server 303 receives the request for the authentication screen to the local Web server 303 which is the URL redirect destination server from the terminal 110 through the authentication processing unit 304, the local Web server 303 acquires the authentication screen data 309 (365), and transmits the authentication screen data through the authentication processing unit 304 and the LAN switch control unit 314 in response to the request.

If the terminal 110 has been completely authenticated through the authenticating process of the external Web server 120 or the local Web server 303, the authentication registration unit 302 extracts the information on the terminal 110 from the non-authenticated terminal registration table 310, and registers the information 390 on the terminal 110, and the before-authentication URL 395 in the authenticated terminal registration table 308 (377). Also, the authentication registration unit 302 extracts the authentication permission completion screen from the authentication screen data 309, and supplies the extracted authentication permission completion screen to the terminal 110 (376). If there is a notification of the authentication permission from the external authentication server 150, the external authentication server 150 notifies the authentication registration unit 302 of the authentication permission through the transfer control unit 300 and the packet transmit/receive unit 301 (335, 360) (377).

The authentication registration unit 302 registers the information on the terminal 110 in the authenticated terminal registration table 308 (375). With this registration, the information on the terminal 110 is registered in the packet transfer table 311, to enable an access to the given site of the network from the terminal 110. Further, the authentication registration unit 302 notifies the terminal 110 of the authentication completion screen extracted from the authentication screen data 309, and the before-authentication URL included in the authenticated terminal registration table 308 through the packet transmit/receive unit 301 and the transfer control unit 300 (376). The terminal 110 jumps with the use of the before-authentication URL to enable an access to a content provided by a given site. In another technique for notifying the terminal 110 of the before-authentication URL, the authentication registration unit 302 may extract the before-authentication URL included in the access request to the given site from the before-authentication terminal 110, and take over the before-authentication UR in each processing.

The life-and-death monitoring control unit 305 is an example of the state management unit 102. The life-and-death monitoring control unit 305 monitors the life-and-death state of the external Web server 120 through the network, and registers the life-and-death result in the life-and-death monitoring table 307 (390). The life-and-death monitoring control unit 305 extracts the life-and-death information on the external Web server 120 from the life-and-death monitoring table 307 which is present in the storage unit 313 (390), and notifies the authentication processing unit 304 of the life-and-death information (366). The device of the authentication switch is configured as described above.

The life-and-death monitoring table 307 will be described with reference to FIG. 4. The life-and-death monitoring table 307 manages a state of the external Web server. For example, the life-and-death monitoring table 307 includes a URL 600, an IP address 601, a life-and-death state 602, a monitor interval time 603, a normal specified number 604, a failure specified number 605, a normal counter 606, a failure counter 607, and a priority 608. The information on the life-and-death state is associated with the combination of the URL 600 and the IP address 601 for each of the external Web servers 120. The URL 600 records the URL of the external Web server 120 therein. The IP address 601 records the IP address of the external Web server 120.

The life-and-death state 602 registers or updates the running operation of the external Web server 120. The life-and-death state 602 records "0" if the external Web server 120 normally runs, and "1" if the external Web server 120 is in failure. The monitor interval time 603 is a health check cyclic time (second unit) for the external Web server 120, and can be arbitrarily set. The normal specified number 604 is a number of successive responses to the health check for determining that the external Web server 120 is in the normal state and can be arbitrarily set. The failure specified number 605 is a number of successive no response to the health check for determining that the external Web server 120 is in the failure state and can be arbitrarily set. The normal counter 606 records the number of responses to the health check. The failure counter 607 records the number of no responses to the health check. The priority 608 arbitrarily designates the priority with a numerical number. As the numerical number is smaller, the priority is higher.

The life-and-death monitoring table 307 may be configured to manage the information on the life-and-death states of the plurality of external Web servers 120, and may be configured to manage the information on the life-and-death state of one external Web server 120 corresponding to each of the authentication switches 100.

If the life-and-death monitoring table 307 is configured without the priority 608, the highest entry may be first referred to among the entries of the plurality of external Web servers 120.

A description will be given of an HTTP response message format including the designation of the URL redirect destination server for designating the external Web server 120 or the local Web server 303 with reference to FIG. 5. The redirect destination URL is stored in the location header of the general HTTP response message format. On the other hand, in this embodiment, the HTTP response message format is expanded, and includes a header having a redirect destination URL (or IP address) 700, a host name 701 of the authentication switch 100, a MAC address 702 of the authentication switch 100, an IP address 703 of the authentication switch 100, a MAC address 704 of the terminal 110, a VLAN number 705 of the terminal 110, an IP address 706 of the terminal 110, and a port number 707 connected with the terminal 110, and a URL 708 (URL before authentication) before redirect. The before-redirect URL 708 (URL before authentication) may be included in the http data transferred between the respective sequences in FIG. 2.

With the information on the authentication switch 100 and the terminal 110, the external Web server 120 can transmit the authentication screen corresponding to an installation location and a user to the terminal 110.

The processing flow of the life-and-death monitoring control unit 305 will be described with reference to FIG. 6.

First, the life-and-death monitoring control unit 305 implements the health check on all of the external Web servers 120 registered in the life-and-death monitoring control unit 305 in a cycle of the monitor interval time 603 of the life-and-death monitoring table 307 (S512). The life-and-death monitoring control unit 305 implements the health check on the external Web server 120 in a cycle of the monitor interval time 603 of the life-and-death monitoring table 307 (S500).

The health check may be conducted by a TCP monitoring system. If a connection establishment (SYN+ACK reception) is made for a TCP connection (SYN transmission) with the external Web server 120, it is determined as a response. If the connection establishment fails, or the connection is refused (RST reception), it is determined as no response. Also, the health check may be configured as an ICMP monitoring system. If a response of an ICMP echo reply is received in response to an ICMP echo request, it is determined as the response. If timeout (for example, 1 second) is made, it is determined as no response.

If the life-and-death monitoring control unit 305 determines that the external Web server 120 is responsive to the health check, an answer in Step S501 is yes, and the life-and-death monitoring control unit 305 increments the normal counter 606 by one (S502). Further, the life-and-death monitoring control unit 305 sets the failure counter 607 to "0" (S503). If a value of the normal counter 606 matches a value of the normal specified number 604, a response in Step S504 is yes, and the life-and-death monitoring control unit 305 sets a value of the life-and-death state 602 to "0" (S505). That is, the external Web server 120 normally runs. Further, the life-and-death monitoring control unit 305 sets the normal counter 606 to "0" (S506). If the response in Step S504 is no, the flow proceeds to Step S512.

On the other hand, if the life-and-death monitoring control unit 305 determines that the external Web server 120 is non-responsive to the health check, the answer in Step S501 is no, and the life-and-death monitoring control unit 305 increments the failure counter 607 by one (S507). Further, the life-and-death monitoring control unit 305 sets the normal counter 606 to "0" (S508). If a value of the failure counter 607 matches a value of the failure specified number 605, a response in Step S509 is yes, and the life-and-death monitoring control unit 305 sets a value of the life-and-death state 602 to "1" (S510). That is, the life-and-death monitoring control unit 305 determines that the external Web server 120 is in failure. Further, the life-and-death monitoring control unit 305 sets the failure counter 607 to "0" (S511). If the response in Step S509 is no, the flow proceeds to Step S512.

Figure 6:
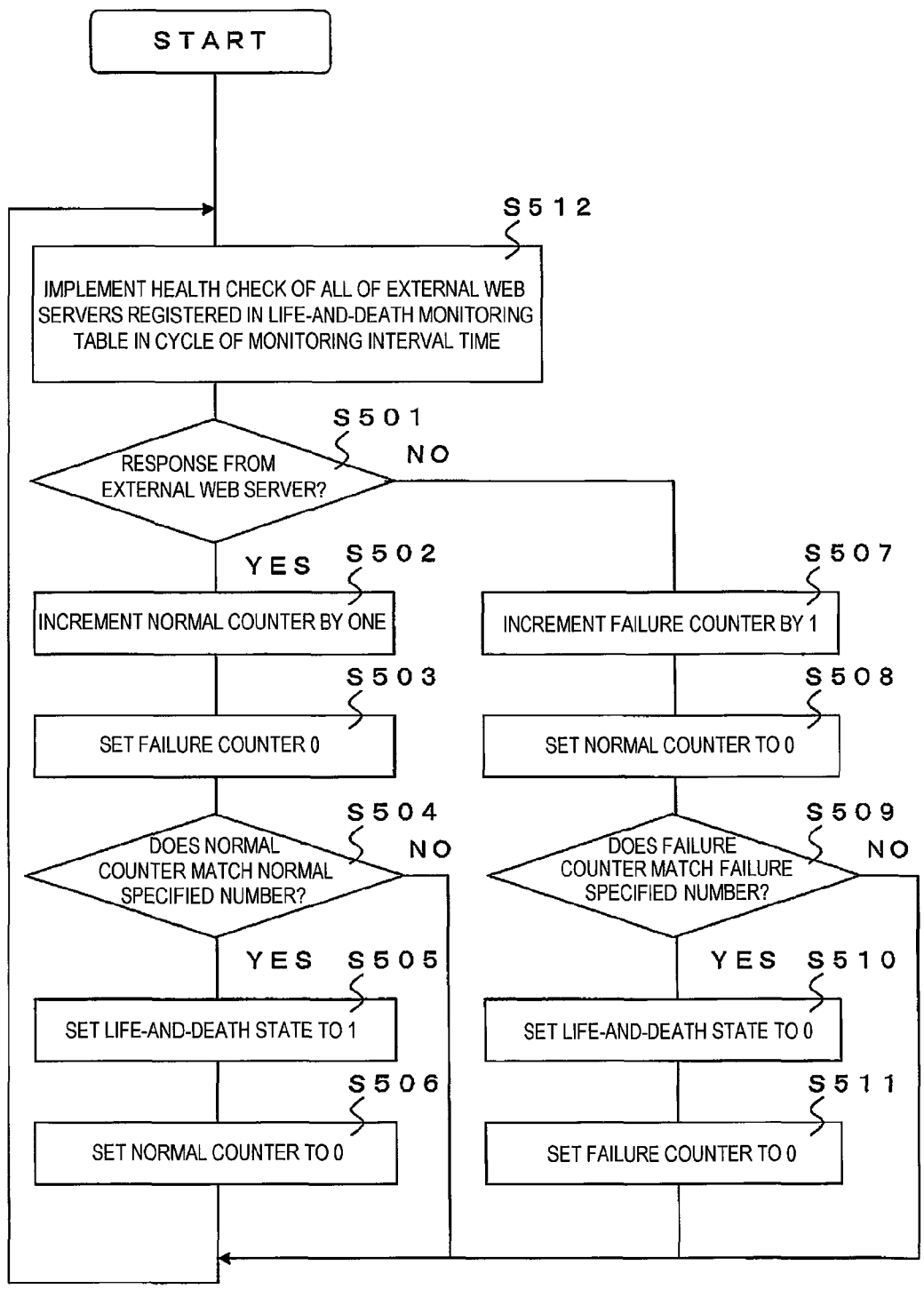
FIG. 6 is a flowchart illustrating processing of a life-and-death monitoring control unit according to a first embodiment.

For example, if the external Web server 120 is in failure, and the URL redirect destination server is being used as the local Web server 303, the external Web server 120 is restored from the failure state, and normally runs, a value of the life-and-death state 602 is changed from "1" to "0" according to the processing flow described in FIG. 6.

Figure 7:
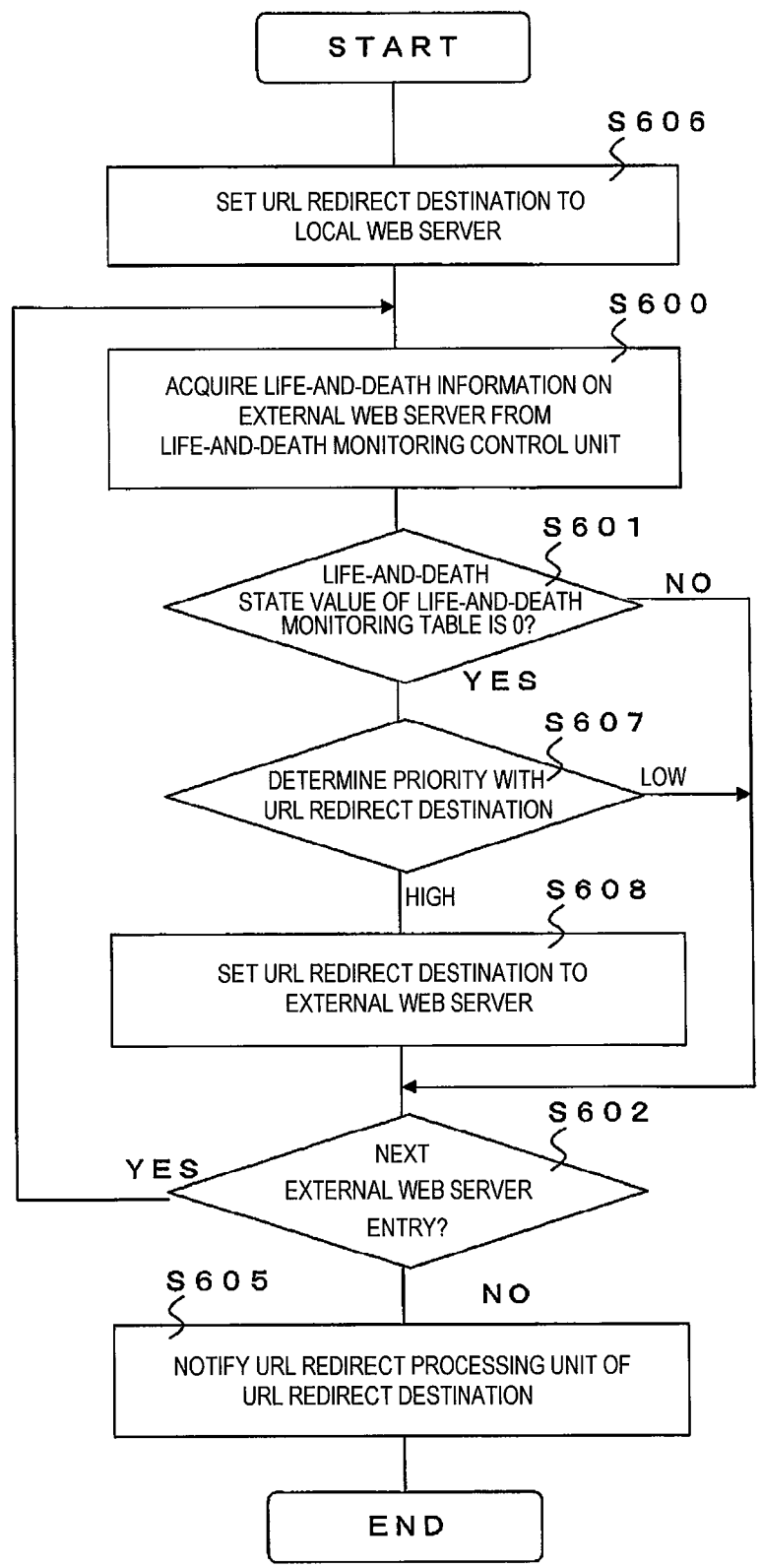
FIG. 7 is a flowchart illustrating a URL redirect destination switching process by an authentication processing unit according to the first embodiment.

Subsequently, a description will be given of a Web server switching process flow by the authentication processing unit 304 with reference to FIG. 7. First, the authentication processing unit 304 sets the URL redirect destination to the local Web server 303 (S606). The authentication processing unit 304 acquires the life-and-death information on the external Web server 120 for one entry from the life-and-death monitoring control unit 305 (S600).

If a value of the life-and-death state 602 of the life-and-death monitoring table 307 is "0", that is, the external Web server 120 normally runs (yes in Step S601), the authentication processing unit 304 conducts a comparison with the priority 608 of the external Web server 120 which is the present URL redirect destination (S607). As a result of comparisons, if the priority of the local Web server 303 is higher, the authentication processing unit 304 sets the URL redirect destination server to the external Web server (S608). In a comparison with the local Web server in Step S607, the authentication processing unit 304 sets the URL redirect destination server to the external Web server (S608).

If there is a next external Web server entry, a response in Step S602 is yes, the life-and-death information is also acquired from the next Web server. If the response in Step S601 is no, the flow proceeds to Step S602. As a result of comparing the priority 608 in Step S607, if the priority of the local Web server 303 is lower, the flow proceeds to Step S602. If the response in Step S602 is no, the determined URL redirect destination is notified to the URL redirect processing unit 306 (S605).

In Step S600, the authentication processing unit 304 may acquire the life-and-death information on the external Web server 120 with reference to the life-and-death monitoring table 307. Also, the authentication processing unit 304 may conduct the health check of the external authentication server with the use of the IP address held in the life-and-death monitoring table 307, and acquire the life-and-death information.

If Step S607 is omitted, and there is the plurality of external Web servers 120 that normally runs, the authentication processing unit 304 may select the external Web server 120 corresponding to the life-and-death information entry indicative of the normal running in Step S600. Also, if Step S606 is omitted, the authentication processing unit 304 may start the Web server switching process from Step S600.

Also, the authentication processing unit 304 may select the external Web server 120 according to the terminal information on the terminal 110, the connection information on the terminal 110, or the type of a given site of the network to be accessed from the terminal 110. In this case, the authentication switch 100 refers to the server selection condition table 315 held by the storage unit 313. A specific example will be described with reference to FIGS. 8 and 9.

The server selection condition table configuration will be described with reference to FIG. 8. Elements that can configure the terminals and the connection information 700 are the IP address or the MAC address of the terminal 110, and can be arbitrarily set. In an example of FIG. 8, the terminal and connection information 700 is the IP address of the terminal 110. The terminal information may be replaced with the connection information (for example, port No. connected with the terminal 110, the VLAN No. of the terminal 110) on the terminal 110, or the type (for example, a domain of the site) of a given site of the network accessed from the terminal 110. The URL 701 of the external Web server 120 is the URL of the external Web server 120 corresponding to the terminal and connection information 700, and can be arbitrarily set.

Figure 9:
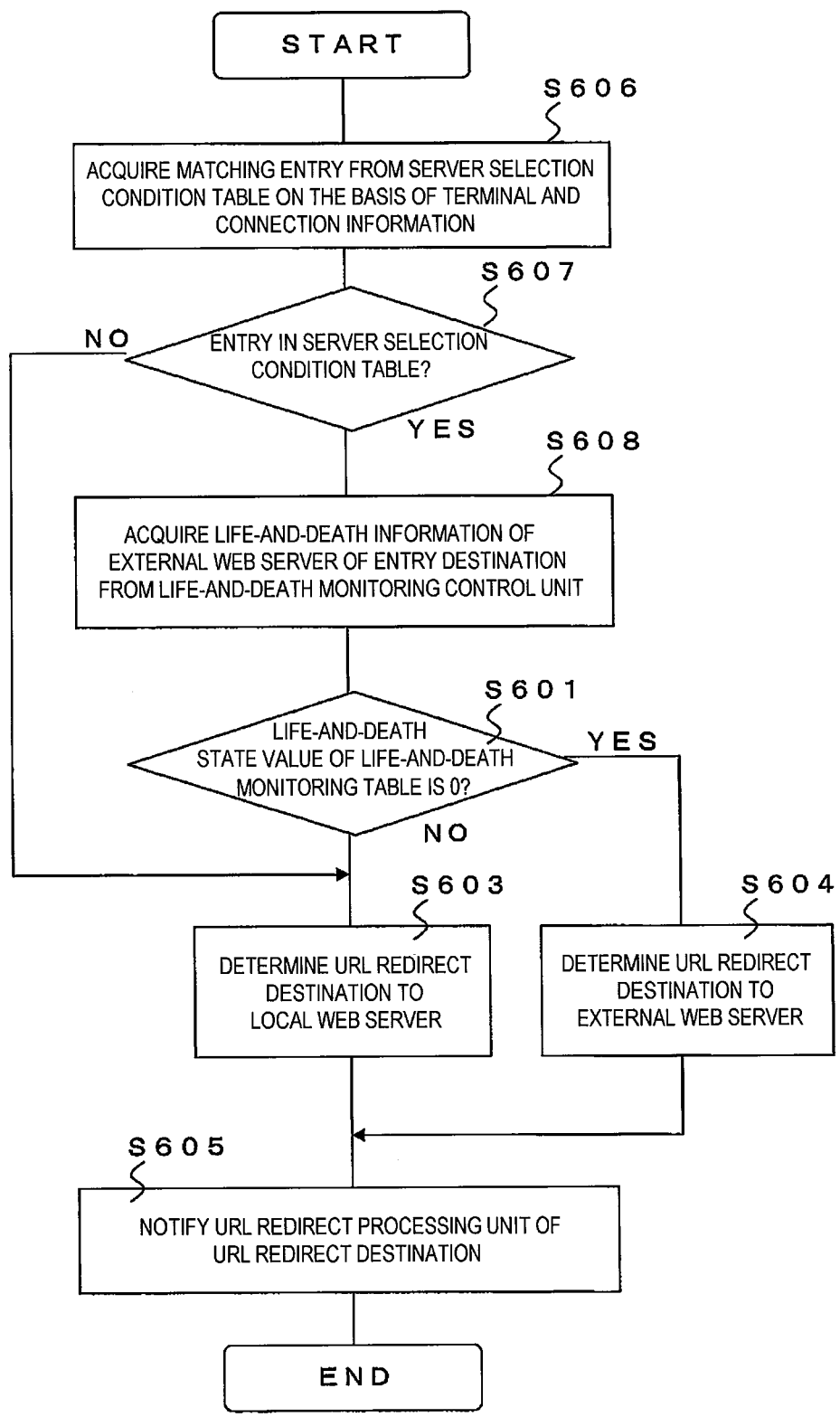
FIG. 9 is a diagram illustrating a modified example of a Web server switching process by the authentication processing unit when a plurality of external Web servers is provided.

Subsequently, the external Web server selecting process using the server selection condition table 315 will be described with reference to FIG. 9. Referring to FIG. 9, a matching entry is acquired from the server selection condition table 315 on the basis of the terminal and connection information on the terminal 110 (S606). If the entry is present in the server selection condition table 315, a response in Step S607 is yes, the life-and-death information on the external Web server 120 of the entry destination is acquired from the life-and-death monitoring control unit 305 (S608). If the response in Step S607 is no, the flow proceeds to Step S603. If the value of the life-and-death state 602 in the life-and-death monitoring table 307 is "0", that is, the external Web server 120 normally runs, the URL redirect destination is determined to the external Web server 120 (S604). If the external Web server 120 is in failure, a response in Step S601 is no, the URL redirect destination is determined to the local Web server 303 (S603). The determined URL redirect destination is notified to the URL redirect processing unit 306 (S605). The above is described with reference to FIG. 9.

The present invention is not limited to the above embodiment, but includes a variety of modified examples. For example, the above embodiment is described in detail for facilitating understanding of the present invention, and the present invention does not always include all of the configurations described above. Also, a part of the configuration of one embodiment can be replaced with the configuration of another embodiment, and the configuration of one embodiment can be added with the configuration of another embodiment. Further, a part of the configuration of the respective embodiments can be added with another configuration, in a part of the respective configuration examples, another configuration can be added, deleted, or replaced.

For example, as the above-mentioned embodiment, the authentication switch is provided with the life-and-death monitoring control unit that monitors the life-and-death state of the external Web server, and the authentication processing unit that selectively controls an optimum Web server with the use of the life-and-death monitoring table and the server selection condition table. Specifically, the life-and-death monitoring control unit has a unit for conducting the life-and-death monitoring on the external Web servers registered in the life-and-death monitoring table, and registering a state of the external Web servers in the life-and-death monitoring table. The authentication processing unit has a unit that uses an authentication screen (login screen data) held by the external Web server if the external Web server normally runs, and uses the authentication screen (login screen data) held by the local Web server within the authentication switch if the external Web server is in failure, with reference to the life-and-death monitoring table.

If the plurality of external Web servers is provided, the authentication processing unit has a unit that can set the priority of the external Web servers for the life-and-death monitoring table, and set another external Web server to the redirect destination even if a failure occurs in the external Web server on the basis of the life-and-death monitoring result of the external Web servers by the life-and-death monitoring control unit.

If the plurality of external Web servers is provided, the authentication processing unit has a unit that provides the server selection condition table with the terminal information such as the MAC address, the connection information, and information such as the type of a given site of the network accessed from the terminal for each of the external Web servers, and selects the external Web server from appropriate terminal information, determines the appropriate redirect destination external Web server from the life-and-death monitoring table, and notifies the terminal of the determined external Web server if there is an authentication request from the terminal.

The authentication processing unit has a unit that selects the Web server with the use of the life-and-death monitoring control unit in response to the authentication request from the terminal, and notifies the terminal of the redirect destination with the use of the URL redirect processing unit.

In the network authentication using the Web authentication system, the authentication switch monitors the failure of the external Web servers provided with the authentication screen (login screen data), to thereby enable the network authentication using the Web server within the authentication switch even if the external Web server is in failure.

In the network authentication using the Web authentication system, the plurality of external Web servers provided with the authentication screen (login screen data) is prepared, and the authentication switch selects the appropriate external Web server on the basis of priority control information, to thereby enable the redundant operation of the external Web server. In the network authentication using the Web authentication system, the plurality of external Web servers provided with plural types of authentication screens (login screen data) is prepared, and the authentication switch selects the external Web server in correspondence with the terminal information, the terminal connection information, and the type information on the given site of the network accessed from the terminal, thereby being capable of transmitting the authentication screen corresponding to the connection location of the terminal, or the type of the terminal to the terminal. That is, additional information other than the area of the authentication screen (login screen data) where the user ID and the password are entered is changed according to the terminal or the connection status of the terminal, and distributed to the user using the terminal, to thereby enable an improvement in the convenience.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD. Also, the control lines and the information lines necessary for description are illustrated, and all of the control lines and the information lines necessary for products are not illustrated. In fact, it may be conceivable that most of the configurations are connected to each other.

What is claimed is:

1. An authentication switch that is connected to a terminal, an authentication server which performs an authentication process, a first server that holds a first content associated with the authentication process of the authentication server, and a second server with which the terminal can communicate according to an authentication result of the authentication server through a network, and the authentication switch is disposed between the terminal and the first server, the second server, and the authentication server, the authentication switch comprising:
an interface to communicate with the terminal, the first server, the second server, and the authentication server through the network;
a processor; and
a memory which stores instructions that, when executed by the processor, cause the processor to implement:
a state monitoring unit that monitors a state of the first server;
a local web server that holds a second content associated with the authentication process of the authentication server;
a redirect notifying unit that makes a redirect notification including a redirect destination to the terminal on the basis of an access status from the terminal and the state of the first server when receiving an access request to the second server from the terminal, such that when the access status indicates that the terminal is not authenticated, the redirect notifying unit makes the redirect notification including a URL of the first server as the redirect destination when the state of the first server indicates the first server is operating, and makes the redirect notification including a URL of the local web server when the state of the first server indicates the first server has failed;
an authentication unit that stores the access status and updates, when the state of the first server indicates the first server is operating, the access status of the terminal on the basis of an authentication result from the authentication server based on data associated with the first content, which is supplied to the terminal in response to a request from the terminal according to the redirect destination, and updates, when the state of the first server indicates the first server has failed, the access status of the terminal on the basis of the authentication result from the authentication server based on data associated with the second content, which is supplied to the terminal in response to a request from the terminal according to the redirect destination; and
a relay processing unit that relays a communication from the terminal to the second server according to the information included in the access request.

2. The authentication switch according to claim 1, wherein the redirect notification unit determines the redirect destination from among the first server, a plurality of additional first servers that hold the first content, and the local web server.

3. The authentication switch according to claim 1, wherein the redirect notification unit determines the redirect destination according to terminal and connection information, or the type of a given site of a network accessed from the terminal.

4. The authentication switch according to claim 1, wherein interface receives communications from the terminal according to http protocol, and the authentication process is a Web authenticating process conducted based on the access request to the second server from the terminal.

5. The authentication switch according to claim 1, wherein a first content and the second content login screens for conducting the authentication process.

6. The authentication switch according to claim 1 wherein the first content is larger in size than the second content.

7. An authentication processing method in an authentication switch that is connected to an authentication server which performs an authentication process, a first server that holds a first content associated with the authentication process of the authentication server, and a second server with which the terminal can communicate according to an authentication result of the authentication server through a network,
the authentication switch is disposed between the terminal and the first server, the second server, and the authentication server, and
the authentication switch includes a local web server that holds a second content associated with the authentication process of the authentication server,
the authentication processing method comprising:
monitoring a state of the first server;
storing an access status of the terminal;
when receiving an access request to the second server from the terminal, the access status indicates that the terminal is not authenticated, and the state of the first server indicates the first server is operating, transmitting a redirect notification including a URL of the first server as a redirect destination to the terminal;
when receiving the access request to the second server from the terminal, the access status indicates that the terminal is not authenticated, and the state of the first server indicates the first server has failed, transmitting the redirect notification including a URL of the local web server as the redirect destination to the terminal
updating, when the state of the first server indicates the first server is operating, the access status of the terminal on the basis of an authentication result from the authentication server based on data associated with the first content, which is supplied to the terminal in response to a request from the terminal according to the redirect notification;
updating, when the state of the first server indicates the first server has failed, the access status of the terminal on the basis of the authentication result from the authentication server based on data associated with the second content, which is supplied to the terminal in response to the request from the terminal according to the redirect notification; and relaying a communication from the terminal to the second server according to the access request.

8. A network system, comprising:

a terminal;

an authentication server which performs an authentication process;

a first server that holds a first content associated with data to be transmitted to the authentication server;

a second server with which the terminal communicates according to an authentication result of the authentication server; and an authentication switch that is connected to the terminal, the first server, the second server, and the authentication server through a network, and the authentication switch is disposed between the terminal and the first server, the second server, and the authentication server wherein the authentication switch includes:

an interface to communicate with the terminal, the first server, the second server, and the authentication server through the network;

a processor; and a memory which stores instructions that, when executed by the processor, cause the processor to implement:

a state monitoring unit that monitors a state of the first server;

a local web server that holds a second content associated with the authentication process of the authentication server;

a redirect notifying unit that makes a redirect notification including a redirect destination to the terminal on the basis of an access status from the terminal and the state of the first server when receiving an access request to the second server from the terminal, such that when the access status indicates that the terminal is not authenticated, the redirect notifying unit makes the redirect notification including a URL of the first server as the redirect destination when the state of the first server indicates the first server is operating, and makes the redirect notification including a URL of the local web server when the state of the first server indicates the first server has failed;

an authentication unit that stores the access status and updates, when the state of the first server indicates the first server is operating, the access status of the terminal on the basis of an authentication result from the authentication server based on data associated with the first content, which is supplied to the terminal in response to a request from the terminal according to the redirect destination, and updates, when the state of the first server indicates the first server has failed, the access status of the terminal on the basis of the authentication result from the authentication server based on data associated with the second content, which is supplied to the terminal in response to a request from the terminal according to the redirect destination; and a relay processing unit that relays a communication from the terminal to the second server according to the information included in the access request.

* * * * *